UNITED STATES PATENT OFFICE.

CHARLES N. WAITE, OF MEDFORD, MASSACHUSETTS, ASSIGNOR TO THE AVERY LACTATE COMPANY, OF PORTSMOUTH, NEW HAMPSHIRE.

LAXATIVE COMPOUND.

SPECIFICATION forming part of Letters Patent No. 330,532, dated November 17, 1885.

Application filed April 17, 1885. Serial No. 162,591. (No specimens.)

*To all whom it may concern:*

Be it known that I, CHARLES N. WAITE, of Medford, in the county of Middlesex and State of Massachusetts, have invented certain new and useful Improvements in Laxative Compounds, of which the following is a specification.

This invention consists in a laxative compound or preparation composed of lactic acid and magnesia, in which the acid is in excess of the magnesia, the proportion of acid employed being from four to eight times the amount that is required to form a neutral lactate of magnesia. In making this preparation I have used the following formula with good results: Take one ounce of lactic acid, (full strength,) sixty grains of carbonated magnesia, and seven ounces of water. This constitutes a liquid lactate of magnesia, of which an ordinary dose is one tea-spoonful. I find that the combination of lactic acid with magnesia greatly increases the potency of the latter without making its effects unpleasant, and without imparting the bitter and disagreeable taste of the compounds of magnesia heretofore used, thus furnishing an agreeable laxative.

For convenience, I may evaporate the compound, so as to convert it into a dry powder.

I claim—

A laxative compound consisting of a mixture of one ounce of lactic acid, sixty grains of magnesia, and seven ounces of water.

In testimony whereof I have signed my name to this specification, in the presence of two subscribing witnesses, this 9th day of April, 1885.

CHARLES N. WAITE.

Witnesses:
C. F. BROWN,
A. L. WHITE.